Figure 9:
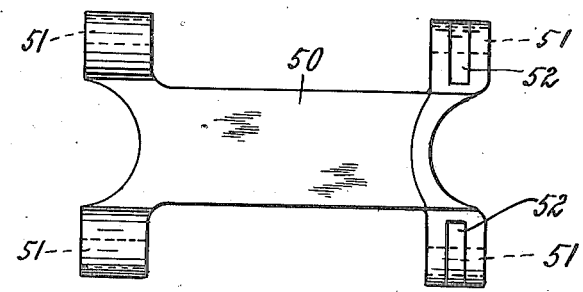

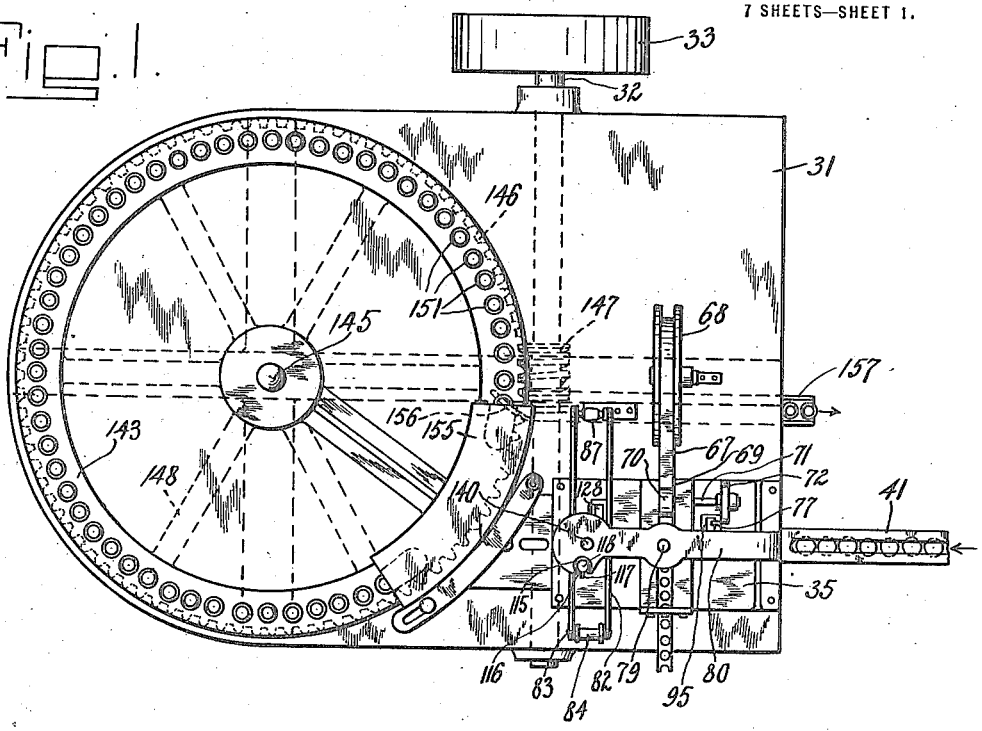

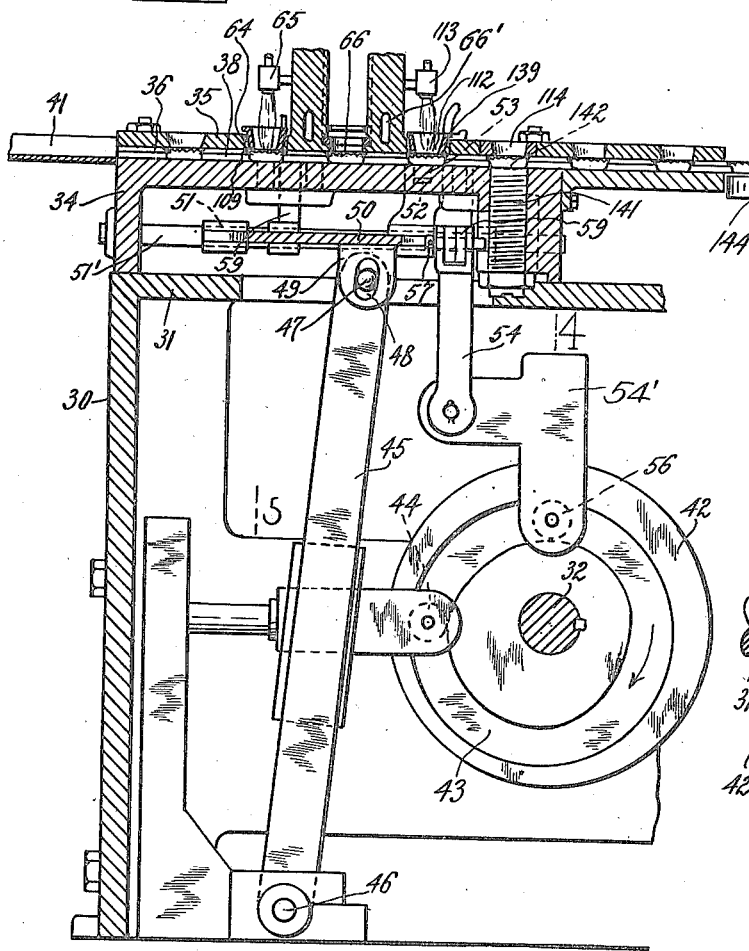
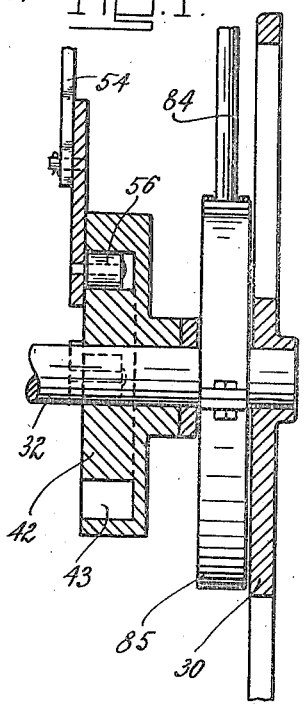
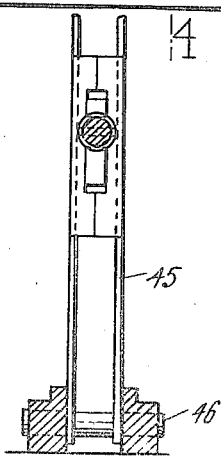

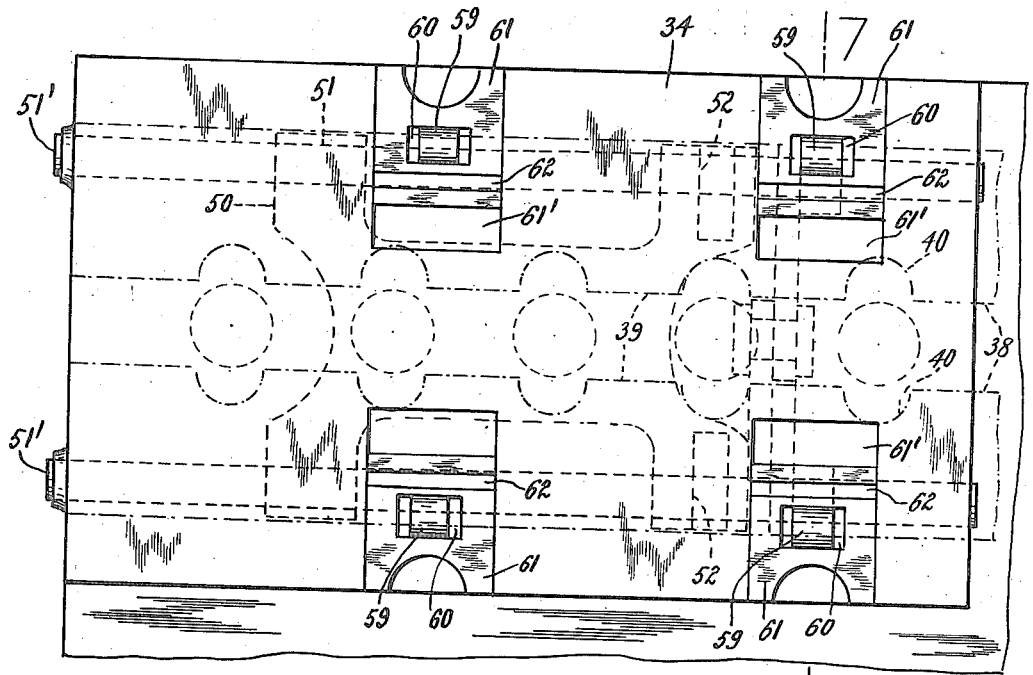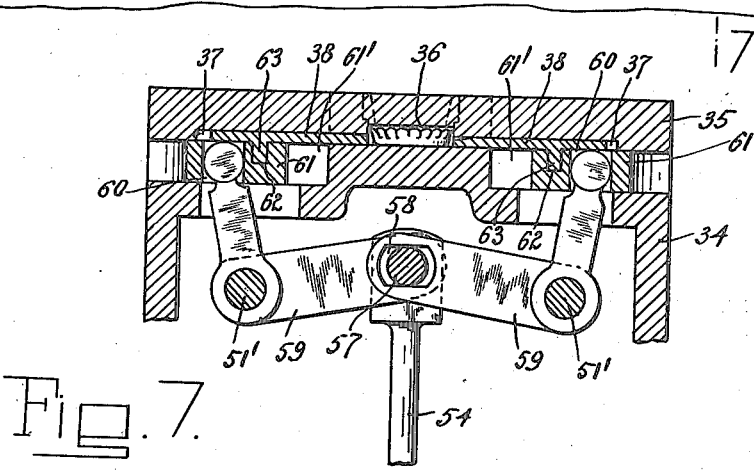

A. BOGDÁNFFY.
MACHINE FOR THE MANUFACTURE OF BOTTLE CLOSURES.
APPLICATION FILED JULY 5, 1913.

1,169,608.

Patented Jan. 25, 1916.
7 SHEETS—SHEET 4.

WITNESSES

INVENTOR
BY
ATTORNEY

A. BOGDÁNFFY.
MACHINE FOR THE MANUFACTURE OF BOTTLE CLOSURES.
APPLICATION FILED JULY 5, 1913.

1,169,608.

Patented Jan. 25, 1916.
7 SHEETS—SHEET 5.

WITNESSES
Wm. Klink
S. Birnbaum

INVENTOR
A. Bogdánffy
BY
Sigmund Herzog
his ATTORNEY

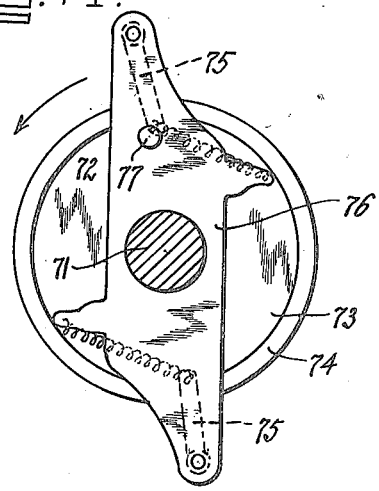
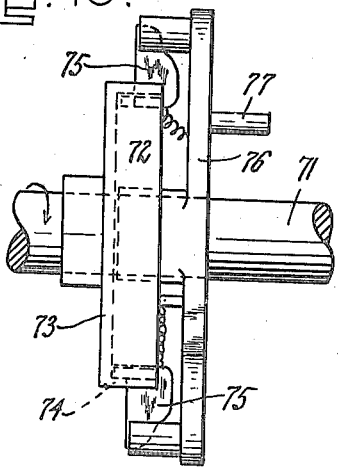
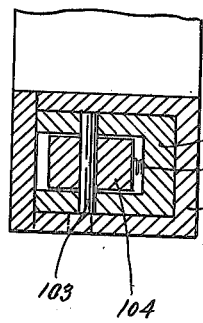
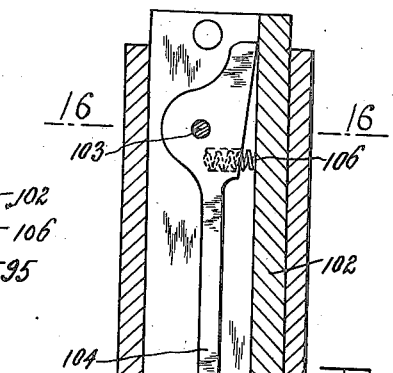
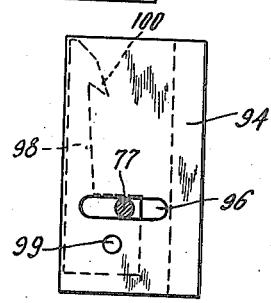
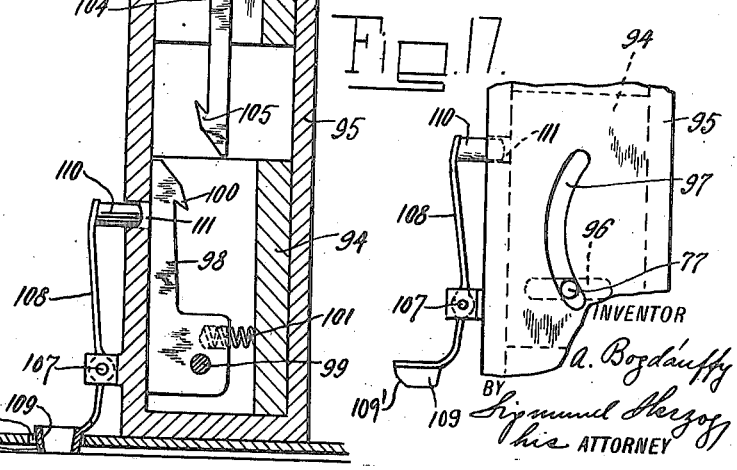

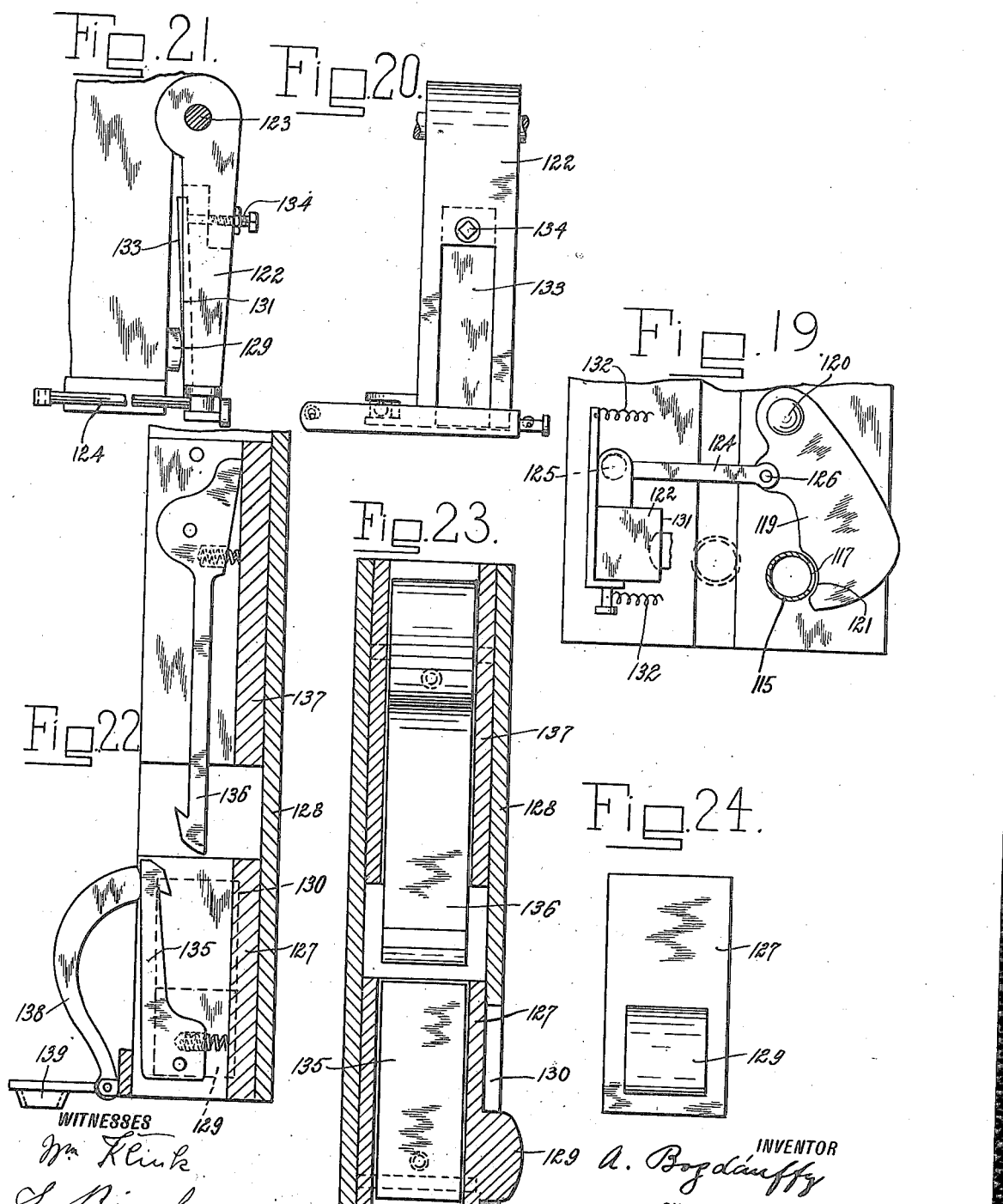

UNITED STATES PATENT OFFICE.

ALEXANDER BOGDÁNFFY, OF NEW YORK, N. Y., ASSIGNOR TO THE INTERNATIONAL CORK COMPANY, OF BROOKLYN, NEW YORK, A CORPORATION OF NEW YORK.

MACHINE FOR THE MANUFACTURE OF BOTTLE-CLOSURES.

1,169,608.  Specification of Letters Patent.  Patented Jan. 25, 1916.

Application filed July 5, 1913. Serial No. 777,466.

*To all whom it may concern:*

Be it known that I, ALEXANDER BOG-DÁNFFY, a subject of the King of Hungary, and resident of the city of New York, in the county of Kings and State of New York, have invented certain new and useful Improvements in Machines for the Manufacture of Bottle-Closures, of which the following is a specification.

The present invention relates to a machine for the manufacture of bottle closures of the class known as "crown cork sealing caps or closures." Closures of this type comprise usually three parts, that is a metallic cap having a corrugated flange to be locked to the exterior of the bottle neck, a sealing disk or packing of cork or the like, and an impervious binding medium, for instance in the form of a disk, interposed between the metallic cap and the sealing disk. In manufacturing these caps, the binding material is fused or softened and the assembled closure subjected to pressure before the binding material sets or hardens, whereby the said binding material unites the sealing disk with the metallic cap. Usually the three parts mentioned are first assembled and the closure, as a whole, is then subjected to heating action to fuse the binding medium, and afterward pressure is applied. In other cases the caps contain only the binding material when heat is applied to the same, the sealing u.... of cork or the like being inserted subsequently.

Heretofore the outer face of the cap has been subjected to heating action, the heat being conducted by the cap to the binding medium. It has been found in practice that only that portion or surface of the binding material which is in contact with the inner surface of the cap is fully fused, that portion or surface which contacts or is to contact with the sealing disk being softened only to a certain extent. The result of this is that, while the binding material is capable of being properly united with the cap, the union between the sealing disk and the binding material is often defective. When plain or undecorated caps are used, it might be possible to expose the same to heating conditions which might fuse the binding material thoroughly, but when decorated caps are charged with the binding material, and such caps subjected to heating action, the extent of exposure to properly fuse the binding material is ruinous to the said decorated caps, inasmuch as it affects the paint used in decorating the same and otherwise defaces the caps. Even plain caps cannot be heated to such an extent which is required to properly fuse both faces of the binding medium for the reason that the said caps are transported from one place to the other on the assembling and uniting machine at a speed which prevents the proper extent of exposure to heat.

One of the objects of the present invention is to provide a machine for the manufacture of closures, which produces a firm union between the three parts of the closure by reason of the binding medium being properly fused at its contact faces with the cap and packing disk, respectively, thereby obviating the defects above mentioned.

Another object of the invention is to devise a bottle closure assembling machine which prevents the feeding of the binding material and sealing disk to the respective assembling elements of the machine in case the cap advancing means fails to bring a metallic cap in proper relation to said assembling elements.

A further object of the invention is to provide a simple and effective means for carrying the caps in succession to the assembling elements of the machine, and the assembled closure to the uniting means of the same.

With these and other objects in view, which will more fully appear as the nature of the invention is better understood, the same consists in the combination, arrangement and construction of parts hereinafter fully described, pointed out in the appended claims and illustrated in the accompanying drawings, it being understood that many changes may be made in the size and proportion of the several parts and details of construction within the scope of the appended claims without departing from the spirit or sacrificing any of the advantages of the invention.

One of the many possible embodiments of the invention is illustrated in the accompanying drawings, in which:—

Figure 8:
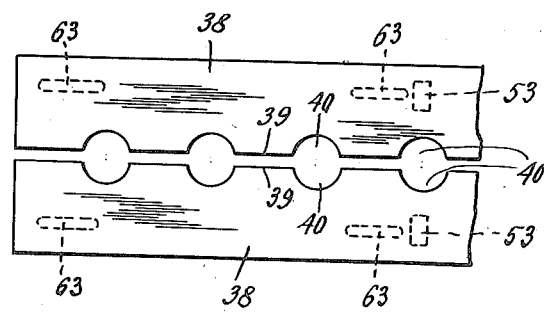
Figure 25:
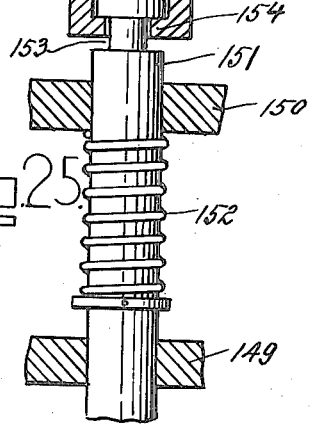
Figure 27:
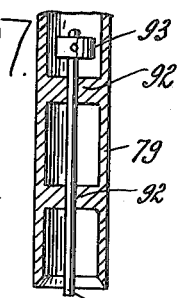
Figure 26:
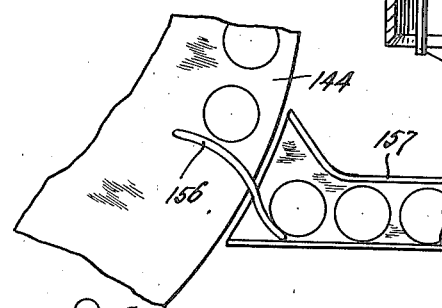
Figure 11:
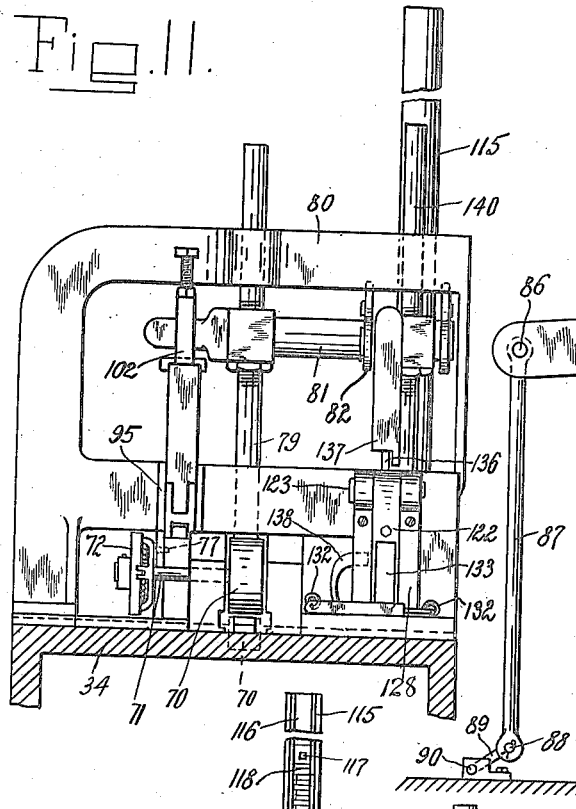
Figure 12:
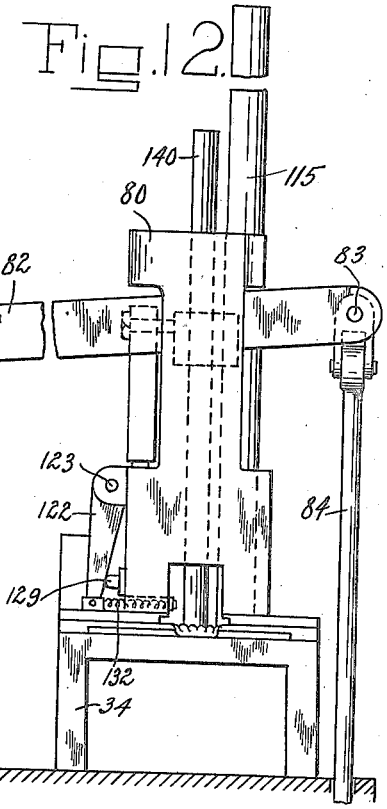
Figure 10:
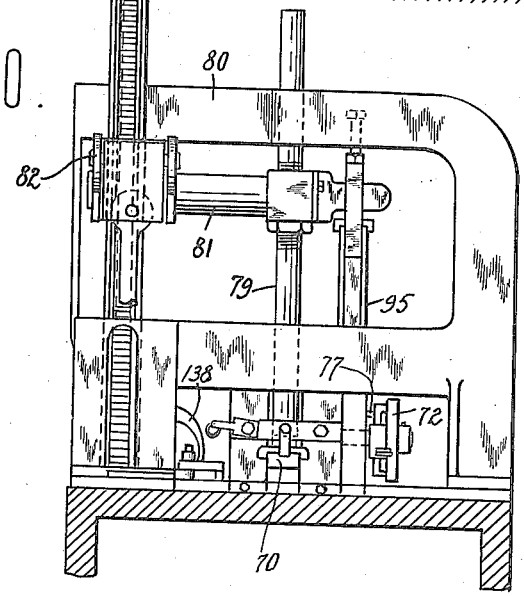

Figure 1 is a plan view of a machine constructed in accordance with the present invention; Fig. 2 is a side elevation thereof;

Fig. 3 is a sectional view of the cap feeding device; Fig. 4 is a section taken on line 4—4 of Fig. 3; Fig. 5 is a section taken on line 5—5 of Fig. 3; Fig. 6 is a plan view of the device shown in Fig. 3, certain parts being removed to more clearly show the interior construction; Fig. 7 is a section taken on line 7—7 of Fig. 6, additional parts being placed on top of it; Fig. 8 is a plan view of a detail of the device shown in Fig. 7; Fig. 9 is a plan view of a detail of the device shown in Fig. 6; Fig. 10 is a front elevation of the assembling means of the machine; Fig. 11 is a rear elevation of the device shown in Fig. 10; Fig. 12 is a side elevation thereof; Fig. 13 is a front elevation of the means for actuating the binding material feeding means; Fig. 14 is a side elevation thereof; Fig. 15 is a longitudinal vertical section taken through the means operating the device shown in Fig. 13; Fig. 16 is a section taken on line 16—16 of Fig. 15; Fig. 17 is a side elevation of a detail of the structure shown in Fig. 15; Fig. 18 is a side elevation also of a detail shown in Fig. 15; Fig. 19 is a plan view of the sealing disk feeding means; Fig. 20 is a rear elevation of a detail shown in Fig. 19; Fig. 21 is a side elevation of the mechanism shown in Fig. 20; Fig. 22 is a sectional elevation taken through the means for actuating the sealing disk feeding means; Fig. 23 is a sectional front elevation of the device shown in Fig. 22; Fig. 24 is a rear elevation of a detail of the device shown in Fig. 23; Fig. 25 is a sectional elevation taken through a portion of the uniting means of the machine; Fig. 26 is a plan view of the means for removing the finished product from the machine; and Fig. 27 is a central vertical section taken through the binding material cutting means.

Broadly speaking, the bottle closures are manufactured on the machine, forming the subject matter of the present application, as follows: The inner surface of a cap is first subjected to an intense heat, the result of which is twofold, that is, first, it evaporates or burns the greasy or oily substance usually covering or spotting the inner surface of the cap, thereby cleaning the said surface effectively, and, second, it heats the inner surface of the cap, whereby, when the impervious binding medium is deposited into the same, its contact surface with the cap is properly fused so that it is adapted to adhere perfectly to the inner surface of the cap. After the binding medium has been deposited into the cap, the exposed surface thereof is heated, resulting in a proper fusing of said surface. The binding medium being properly fused, a sealing disk or packing is placed into the cap, after which the assembled closure is subjected to pressure which firmly unites the parts thereof, the binding material being partly or wholly hardened when the closure is discharged from the machine.

Referring now more particularly to the drawings, the numeral 30 indicates the supporting frame of the machine, for instance, casing-shaped, and provided with a horizontal top or table-section 31. A substantial distance below the table-section is journaled in the frame the main driving shaft 32, to which rotation is imparted, for instance, by a belt running over a driving pulley 33, which is in any suitable manner rigidly fastened to the said shaft. Near one of the longitudinal edges of the table is mounted upon the same a box-like structure 34, upon the top of which is disposed a plate member 35, having a longitudinal groove 36 in its underface, which is adapted to accommodate metallic caps that are fed thereinto in their inverted positions. This groove extends throughout the length of said plate member. Parallel to said groove, and more particularly on each side thereof, is formed in the under face of said plate member a longitudinal recess 37, said recesses opening into said groove, and having slidably arranged therein each a feeding strip 38. These strips are adapted to reciprocate in the longitudinal direction of the box-like structure 34, and also transversely thereof toward and away from each other. The feeding strips 38 are provided in their opposite edges, denoted by the numerals 39, 39, with registering substantially semi-circular notches 40, 40. The edges of these notches are adapted, when the feeding strips are moved toward and close to each other, to grip firmly the head portions of the metallic caps which are located in alinement with said notches in the groove 36, and, as the said strips are advanced in the direction of the longitudinal axis of the box-like structure, to carry them forward a predetermined distance. The caps are brought in their inverted positions into the groove 36 on a chute 41, which receives them from a hopper or similar structure, the construction of which need not be described here as it does not form part of the present invention. The means for imparting to the feeding strips a to and fro motion in the direction of the longitudinal axis of the box-like structure 34, which motion will be hereinafter termed "reciprocating motion", includes a disk 42, which is keyed or otherwise attached to the driving shaft, and provided in one of its faces with a cam groove 43. In this groove is seated a roller 44, carried by a lever 45, one end of which is fulcrumed at 46 to the frame, its other end carrying a pin 47, that is seated in a slot 48 in the downwardly extending lug 49 of a substantially H-shaped block 50. This block is provided in each of its four legs with a cylindrical bore 51, through which are drawn two parallel horizontal rocking shafts 51', which are mounted in the box-like structure 34 parallel to the longitudinal axis of the latter. The block 50 is shiftably arranged upon the said rocking shafts, and provided in its upper face with transverse grooves 52, into which project lugs 53 upon the underfaces of the feeding strips 38. The grooves 52 are of a length to permit the feeding strips to move toward and away from each other; this movement will be termed hereinafter "the swinging movement of the feeding strips". The swinging movement of the feeding strips is effected by a bar 54, which is pivoted to a bracket 54', that is conducted in its up and down movement by vertical guides 55 upon the frame 30, the reciprocating movement of said bracket being caused by a roller 56, which is seated in the cam groove 43 and carried by said bracket. The upper end of the bar 54 is provided with a pin 57, seated in slots 58 of two bell-cranks 59, which are keyed, or otherwise attached, to the rocking shafts 51', the free ends of their other arms engaging apertures 60 in slides 61, in the upper faces of which are formed longitudinal grooves 62, into which project downwardly extending lugs 63 upon the under faces of the feeding strips 38. The slides 61 are located in recesses 61' in the upper face of the box-like structure, and are adapted to move toward and away from each other transversely of the said box-like structure.

From the foregoing it appears that the lever 45 causes a reciprocating motion of the feeding strips, and the bar 54 a swinging motion, that is to say a motion toward and away from each other. The cam groove 43 is shaped in such a manner and the rollers 44 and 56 disposed in such relation that, whenever the lever 45 swings toward the chute 41, the feeding strips are held in their open positions, that is to say away from each other, and, when the lever 45 has reached its outermost position in the direction stated, the feeding strips are caused by the bar 54 to move toward each other into gripping positions, the said feeding strips being kept in such gripping positions while the lever 45 moves in the opposite direction and until it has reached its outermost point in that direction, when the bar 54 causes said strips to recede from each other. When the lever 45 reaches its outermost position in the direction of the chute 41, its outermost notches are brought in operative relation to a cap just received from the chute. The feeding strips then move toward each other, grip the said cap and obviously those in front of the same, advance them a predetermined distance in the groove, and when reaching this position, the feeding fingers recede from each other, thereby leaving the caps at rest.

In this manner there are always a plurality of caps in the groove 36, arranged at distances from each other which correspond to the distances between the notches in a feeding strip. All caps in the groove are brought to rest simultaneously and are also advanced simultaneously.

A cap received from the chute comes first to rest in registering position with a circular opening 64 in the plate member 35. Above this opening is arranged a heating means, consisting, preferably, of a gas burner 65 of the "Bunsen" type to cause a complete combustion of the illuminating gas in order to prevent unconsumed particles of carbon settling on the inner surface of a cap. Inasmuch as the caps travel in the groove 36 in their inverted positions, the mouth of the burner must point downward, the flame being directed to the inner surface of a cap by compressed air that is conducted to the said burner. The result of this action will be two fold, first, it evaporates or burns the greasy or oily substance usually covering or spotting the inner surface of the cap, thereby cleaning the said surface effectively and, second, it heats the inner surface of the cap, whereby, when the impervious binding medium is deposited into the same, its contact surface with the cap will be properly fused so that it will be adapted to adhere perfectly to the inner surface of the cap. The removing of the oily or greasy substance materially aids such union.

After the inner surface of the cap has been heated in the manner described, it is brought by the feeding strips into registering position with a circular opening 66 in the plate member 35, stopping there to receive the binding medium. The binding medium is deposited into the cap in the form of a disk, which is cut from a strip 67 of suitably prepared paper or other material, that is wound upon a reel 68. This reel is journaled in the reel of the machine, the strip being conducted therefrom into a guide 69, to pass between the feeding rollers 70. The upper one of the feeding rollers is fixedly attached to a shaft 71, which is journaled in the frame of the machine and carries on its outer end a friction clutch 72. The clutch comprises a disk 73, keyed or otherwise attached to said shaft, and provided with a flange 74, in engagement with spring pressed dogs 75, which are carried by a lever 76, the latter being loosely mounted upon the shaft 71, and provided with a pin 77 for actuating the same. When the lever 76 is swung in the direction of the arrow shown in Fig. 14 of the drawings, the disk 73 is given a turn through a corresponding distance, carrying with it the upper feeding roller 70, whereby the paper strip 67 is advanced a corresponding distance. When the lever 76 swings in the other direction, obviously, the roller 70 remains stationary. The pin 77 is oscillated by means hereinafter to be described.

The rollers 70 advance the paper strip intermittently to the cutting means, comprising a tubular cutter 79, reciprocably arranged, in registering position with the opening 66, in a frame 80, that is disposed above the plate member 35. To the cutter 79 is secured a horizontally extending arm 81, carrying an actuating arm 82, to one end of which is pivoted at 83 the rod 84 of an eccentric 85, that is keyed, or otherwise attached, to the main driving shaft 32. To guide the movement of the actuating arm 82, its other end is pivoted at 86 to one end of a rod 87, the other end of which, in turn, is secured at 88 in a similar manner to a link 89, that is fulcrumed at 90 to the frame of the machine. Upon the downward movement of the cutter 79, a disk of binding material is cut from the strip 67, said disk being automatically forced, upon the upward movement of the cutter, by a stem 91 into the metallic cap. The stem 91 is slidably arranged in guides 92 within the cutter, and carries upon its upper end a weight 93. When, therefore, the cutter 79 moves upward, the weight 93 will force the stem 91 downward and thereby the paper disk into the cap. After this, upon the further upward movement of the cutter, the uppermost one of the guides 92 will engage the weight 93 and lift thus the stem 91 out of the opening 66 in the plate member 35. Around the opening 66 is formed a water jacket 66', in which circulates a cooling fluid to prevent the strip 67 from being affected by the heat of the burner 65.

The means for actuating the lever 76 of the friction clutch comprises a slide 94, which is reciprocably arranged in a vertical guide 95, formed upon the frame 80. This slide is provided with a horizontal slot 96, in which is seated the pin 77 of the lever 76, and in the guide 95 is formed an arc-shaped slot 97, through which the pin 77 projects. Within the slide 94 is disposed a catch 98, pivoted at 99 to the said slide and provided upon its upper end with a hook 100. A spring 101 tends to force the said catch toward and into engagement with one of the sides of the guide 95. A second slide 102 is also reciprocably arranged in the guide 95, and attached to the arm 81. To this slide is pivoted at 103 a downwardly extending pawl 104, its hook 105 being adapted to engage the hook 100 of the catch 98. A spring 106 forces the hook 105 of the pawl 104 toward and into engagement with the hook 100 of the catch 98. To the guide 95 is pivoted at 107 a lever 108, its lower end carrying a sleeve 109 which is seated in the opening 64 in the plate member 35, while its upper end is provided with a pin 110, which is adapted to project through an aperture 111 in the wall of the guide 95 into the latter. The front edge 109' of the sleeve 109 is tapered. Normally the hook 100 of the catch 98 is in engagement with the hook 105 of the pawl 104 as will be presently described; when, therefore, the arm 81 moves upward, the slide 94 moves therewith and thereby causes the lever 76 of the friction clutch to swing in the direction of the arrow shown in Fig. 14 of the drawings, advancing thus the paper strip a predetermined distance. Upon the downward movement of the arm 81, the paper disk is cut and deposited in the manner above described into the cap, the slide 94 being lowered by the slide 102, contacting therewith, thereby swinging the lever 76 in the opposite direction, during which movement obviously the shaft 71 of the feeding roller 70 remains stationary. If during the downward movement of the slides 94 and 102 there is no cap in registering position with the circular opening 64, the sleeve 109 drops to the bottom of the groove 36, the pin 110 being thus withdrawn from the guide 95. The spring 101 will then disengage the hook 100 of the catch 98 from the hook 105 of the pawl 104. When, therefore, the slide 102 moves upward, it will not carry with it the slide 94, and for this reason the paper strip 67 will not be advanced. In such case, obviously, upon the next downward movement of the cutter 79, no binding disk will be cut. In other words, whenever the feeding strips fail to bring a cap in registering position with the opening 66, no paper disk is cut, nor is one forced through the opening 66 into the groove 36. If a cap is brought into proper position relative to the opening 64, the said cap engages the front edge 109' of the sleeve 109 and lifts the same, thereby causing the pin 110 to project into the guide 95 and to force the hook 100 of the catch 98 against the action of the spring 101 into the path of the hook 105 of the pawl 104. The slide 94 is thus carried upward during the next upward movement of the cutter, and the paper strip fed in operative relation to said cutter.

After the binding medium has been deposited into the cap, the latter is advanced by the feeding strips, and stops in registering position with a circular opening 112 in the plate member 35, above which is disposed a burner 113, that is similar in construction to the one above mentioned. The exposed surface of the binding disk is heated thereby, this heating action resulting in a proper fusing of the exposed surface; the flame which is directed to the said surface by compressed air causing at the same time the binding medium to assume the shape of the inner surface of the cap.

The binding medium having been properly fused, the cap is advanced by the feeding strips, and stops in registering position with a circular opening 114 in the plate member 35, where it receives a sealing disk or packing of cork or the like. The sealing disks are placed into a vertical tube 115, held upon the frame 80, said tube being provided with a longitudinal slot 116, through which a finger piece 117 of a weight 118 protrudes, said weight being placed on top of said sealing disks, and serves to feed them to a conveyer 119, which engages the lowermost of the disks in the tube and transports it into registering position with the circular opening 114. This opening tapers toward the plane of the top portion of the box 34, its upper diameter being larger than that of a sealing disk and its lower diameter being somewhat smaller than that of a disk. The purpose of this arrangement will be explained hereinafter. The conveyer 119 is made in the form of an oscillating plate, which is pivoted at 120 to the plate member 35, its acting end being provided with a notch 121, that is adapted to accommodate a sealing disk. The conveyer 119 is actuated by a lever 122, which is fulcrumed at 123 to the frame 80, and connected by a link 124 with said conveyer; said link being pivoted at 125 and 126 to the said lever and conveyer, respectively. The lever 122 is actuated by a slide 127, reciprocably disposed within a guide 128, the latter being formed upon the frame 80. This slide is provided with a cam 129, projecting through a slot 130 in said guide. The cam bears against the inclined face 131 of the lever 122, the latter being held in contact with said cam by springs 132, which are fastened to the said lever and the frame. The inclined face 131 of the lever is, preferably, formed by a blade spring 133, fastened to the lower end of the lever, and adapted to be adjusted by a set screw 134 to predetermine the swing of the lever. To the slide 127 is pivoted a spring pressed catch 135, which is in all respects identical in construction with the catch 98 above described, and adapted to coöperate with a pawl 136, carried by a slide 137, the latter two elements being similar in construction to the slide 102 and the pawl 104 above described. The slide 137 is attached to the arm 81 above described. A lever 138 is pivoted to the guide 128, said lever being similar to the lever 108 above described, its sleeve 139 being disposed in the opening 112. If a cap is located in the groove 36 in registering position with the opening 112, to be brought into registering position with the opening 114 at the next forward movement of the feeding strips, the lever 138 swings the catch 135 into the path of the pawl 136. The slide 127 will thus be carried upward by the arm 81 and actuate by means of its cam 129 by the intermediary of the lever 122 the conveyer 119, the latter transporting a sealing disk into registering position with the opening 114. The springs 132 return the conveyer and the parts coöperating therewith to their normal positions. Obviously, if there is no cap brought to the opening 112, the slide 127 is not lifted by the slide 137, and the conveyer 119 remains, therefore, stationary. The sealing disk is forced into the cap by an assembling plunger 140, which is reciprocably arranged in the frame 80 and attached to the arm 81. During the downward movement of the plunger 140, the disk is forced by said plunger through the tapering opening 114 into the cap. It should be noted that, since the diameter of the lower end of the opening 114 is smaller than that of a sealing disk, the latter will be compressed to some extent, and, when forced into the cap, will expand and be held thus firmly in the cap. The cap, when in registering position with the opening 114, rests upon a die 141 in the form of a screw bolt, its upper face 142 being concave, conforming thus to the shape of the outer face of the head of a cap.

The assembled crowns are advanced by the feeding strips to a uniting head 143, comprising a disk 144, keyed or otherwise attached to a vertical shaft 145. To this shaft is fixedly attached a worm gear 146, the teeth of which mesh with a worm 147, that is carried by the main driving shaft 32. With the disk 144 are made integral, or there may be attached thereto by means of spokes 148, two rings 149 and 150. These rings are disposed above the disk 144 a suitable distance from each other, as clearly shown in Fig. 2 of the drawings. A plurality of vertically disposed plungers 151 are slidably arranged in the rings 149 and 150, said plungers being located parallel to the shaft 145, and their lower ends being adapted to be forced by springs 152 into contact with the disk 144. The upper ends of the plungers, which project above the ring 150, are provided each with a peripheral recess 153, which is adapted to be engaged by a stationary cam 154, said cam being formed upon a plate 155, that is disposed in parallel relation to the ring 150 above the same. The cam is arranged in the path of the peripheral recesses of the plungers, whereby, as the uniting head rotates, said plungers will be raised by said cam, their springs lowering them as soon as disengaged from said cam. The cam raises a plunger before it arrives opposite to the feeding strips, and is disengaged from said plunger after it has left the said feeding strips. When a plunger arrives in registering position with the feeding strips, an assembled crown is placed upon the disk 144 beneath said plunger and, after the said plunger has been disengaged from the cam, its spring 152 will force the same against the assembled crown cork, placing thereby the closure under compression and holding it in this condition until the closure makes nearly a full revolution around the shaft 145, when the plunger again arrives at the cam and is disengaged from the closure, allowing the latter to be guided by a projection 156 into a chute 157, to slide into a receptacle placed beneath the same. It is obvious that the binding material in the closure is still in its fused or softened condition when arriving upon the disk 144, so that this binding medium, due to the pressure, will firmly unite the parts of the closure, the binding medium being partly or wholly hardened when the closure is discharged into the chute.

It is obvious that the outer face of the cap is in no way affected by heat. The decoration thereon will, therefore, remain in its original state; furthermore both faces of the binding medium are properly fused with a result that a firm union is obtained between the parts of the closure.

The operation of the machine is obvious from the foregoing. It is to be noted that a simple and effective cap transporting mechanism is obtained, means being provided for preventing the advancing of the coated paper strip, the cutting and depositing of a binding disk and the feeding of a sealing disk in case caps are not brought in operative relation to the binding material depositing and sealing disk inserting elements of the machine.

What I claim is:—

1. In a machine for the manufacture of bottle closures of the cap variety, the combination with means for subjecting the inner face of the head of a metallic cap to heat, of means for inserting a binding material into the cap, means for applying heat directly to the exposed face of the binding material, means for depositing a sealing disk into the cap on top of the fused binding material, and means for conveying the cap in succession to each of the elements mentioned.

2. In a machine for the manufacture of bottle closures of the cap variety, the combination with means for subjecting the inner face of the head of a metallic cap to heat, of means for inserting a binding material into the cap, means for applying heat directly to the exposed face of the binding material, means for depositing a sealing disk into the cap on top of the fused binding material, means for holding the sealing disk under pressure within the cap after the parts are assembled and while the binding material is hardening, and means for conveying the cap in succession to each of the elements mentioned.

3. In a machine for the manufacture of bottle closures of the cap variety, the combination with transporting means for a metallic cap, of means for depositing a sealing disk into the cap, a conveyer for carrying the sealing disk to said depositing means, a swinging lever connected to said conveyer, a continuously reciprocating slide, a second slide, coacting means upon said two slides adapted to connect the same, whereby said slides are caused to move together, means upon said second slide for actuating, when moving in one direction, said lever, whereby said conveyer brings a sealing disk into registering position with said depositing means, and means coöperating with said connecting means upon said second slide and actuated by the caps upon said transporting means, whereby said last named connecting means is brought into operative position in relation to said connecting means upon said first slide when said transporting means brings a cap into registering position with said depositing means.

4. In a machine for the manufacture of bottle closures of the cap variety, the combination with transporting means for a metallic cap, of means for depositing a sealing disk into the cap, a conveyer for carrying the sealing disk to said depositing means, a swinging lever connected to said conveyer, a continuously reciprocating slide, a second slide, a pawl upon said first slide, a catch upon said second slide adapted to coact with said pawl so as to connect said two slides, whereby they are caused to move together, means upon said second slide for actuating, when moving in one direction, said lever, whereby said conveyer brings a sealing disk into registering position with said depositing means, and means coöperating with said catch and actuated by the caps upon said transporting means, whereby said catch is brought into operative position in relation to said pawl when said transporting means brings a cap into registering position with said depositing means.

5. In a machine for the manufacture of bottle closures of the cap variety, the combination with transporting means for a metallic cap, of means for cutting a disk from a strip of binding material and inserting it into the cap, a roller for feeding the strip to said cutting means, a clutch connected with said roller, a continuously reciprocating slide, a second slide, coacting means upon said two slides adapted to connect the same, whereby said slides are caused to move together, means upon said second slide for rendering, when moving in one direction, said clutch operative, whereby said roller advances the strip of binding material toward said cutting means, and means coöperating with said connecting means upon said second slide and actuated by the caps upon said transporting means, whereby said last named connecting means is brought into operative position in relation to said connecting means upon said first slide when said transporting means brings a cap into registering position with said inserting means.

6. In a machine for the manufacture of bottle closures of the cap variety, the combination with transporting means for a metallic cap, of means for cutting a disk from a strip of binding material and inserting it into the cap, a roller for feeding the strip to said cutting means, a clutch connected with said roller, a continuously reciprocating slide, a second slide, a pawl upon said first slide, a catch upon said second slide adapted to coact with said pawl so as to connect said two slides, whereby they are caused to move together, means upon said second slide for rendering, when moving in one direction, said clutch operative, whereby said roller advances the strip of binding material toward said cutting means, and means coöperating with said catch and actuated by the caps upon said transporting means, whereby said catch is brought into operative relation to said pawl when said transporting means brings a cap into registering position with said inserting means.

Signed at New York, in the county of New York and State of New York, this 2nd day of July A. D. 1913.

ALEXANDER BOGDÁNFFY.

Witnesses:
JOHN ALBERTI,
SIGMUND HERZOG.